Aug. 21, 1951     T. G. AITCHESON     2,565,419
MICROSCOPE ATTACHMENT AND THE LIKE
Filed June 9, 1948
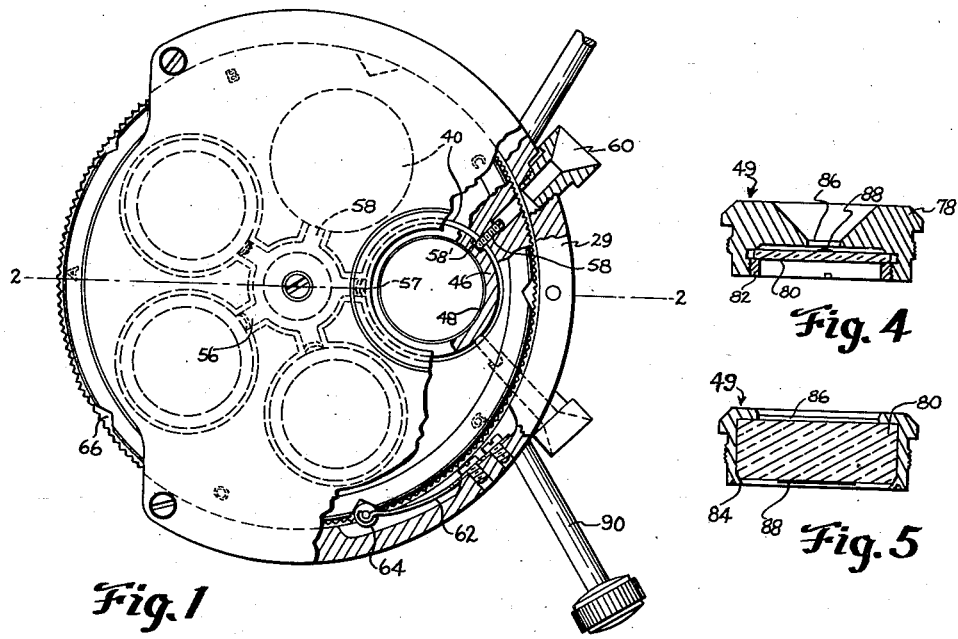
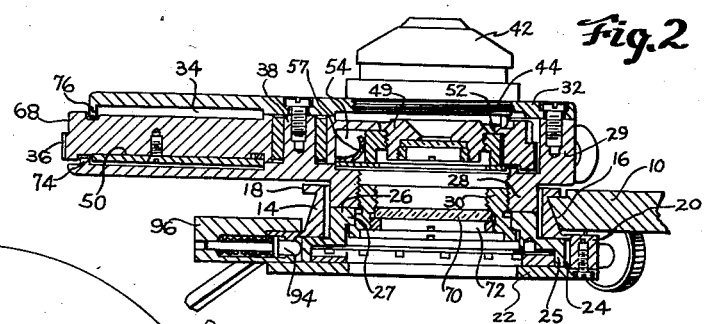
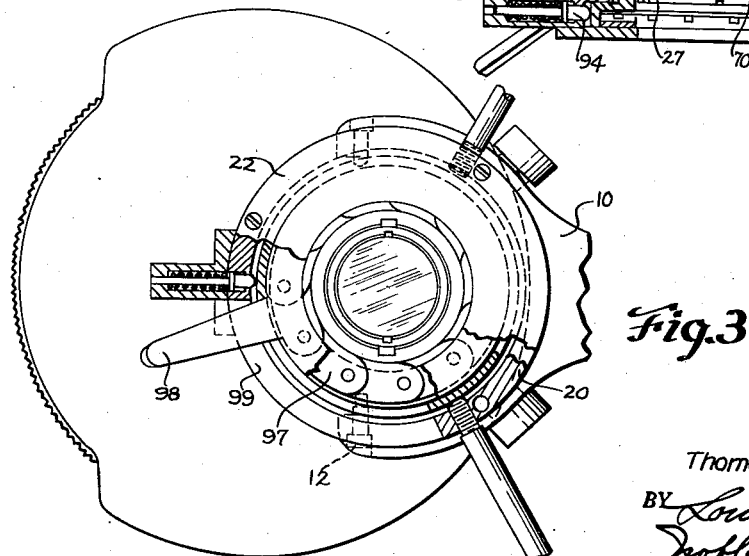
INVENTOR.
Thomas G. Aitcheson Patented Aug. 21, 1951

2,565,419

UNITED STATES PATENT OFFICE 2,565,419

MICROSCOPE ATTACHMENT AND THE LIKE

Thomas G. Aitcheson, Kenmore, N. Y., assignor to American Optical Company, Southbridge, Mass., a voluntary association of Massachusetts Application June 9, 1948, Serial No. 31,994

7 Claims. (Cl. 88—40)

This invention relates to optical instruments employing optical elements which must be accurately aligned and having a plurality of readily interchangeable optical members which must also be individually and accurately located relative to a certain member or members in the optical system of said instrument. The invention is particularly useful in phase microscopy but could also be used advantageously in ophthalmic instruments and the like.

In the Osterberg et al. Patent No. 2,427,689, issued September 23, 1947, is shown and described a phase contrast microscope. The use of such an instrument for the examination of substantially transparent materials and objects, such as protozoa, bacteria, body tissues, blood, glass, plastics and the like, has considerably extended the boundaries of microscopy. It will be noted that this patent describes the use of various different types of phase plates or discs having different transmission and absorption characteristics and that these plates or discs may be located in and carried by individual interchangeable objectives for the instrument. To function with such a phase plate in a phase microscope there is provided an aperture member located in the condenser lens system of the instrument and in predetermined spaced and aligned relation to the phase plate in the objective. The purpose of such an arrangement is clearly set forth in said patent.

During the use of such a phase microscope, it may be desirable to use any one of several different objectives of different powers, each equipped with a phase plate therein, or it might be desirable to interchange objectives of like power but having different types of phase plates mounted therein. In either case it will generally be desirable to interchange the aperture member in the condenser assembly so as to function to best advantage therewith. On the other hand, it might be desirable to interchange aperture members merely for providing low, medium or high contrast. However, regardless of the reasons for the changing of phase plates, or objective and phase plate combined, or aperture member, it has been found highly essential that proper exact predetermined spacing and alignment of each aperture member with the phase plate with which it is to be used be effected for best functioning of the associated phase microscope.

For the foregoing reasons, the invention provides a condenser and turret assembly of efficient, compact and sturdy construction which may be readily fitted in the limited space available beneath the stage of a conventional microscope or the like when same is fitted with a phase objective. The assembly comprises a housing supporting a condenser lens system and a light control means and enclosing a rotatable turret member carrying a plurality of aperture cells in such a manner as to enable easy and accurate positioning of individual aperture members in operative position in the instrument. The assembly is also provided with adjustable means for accurately locating the condenser and turret assembly in optical alignment with the optical axis of the microscope and the individual cells are provided with readily adjustable means for allowing exact centering of each cell relative to the particular phase plate with which it is to be used. Furthermore, the assembly is arranged in such a manner as to substantially completely enclose the cells so that dust and the like will not enter the housing and interfere with the proper operations of the phase microscope. Said assembly is also arranged to allow convenient removal of any of the aperture cells therein and the easy replacement of others therefor.

Other objects and advantages of the invention will become apparent from the detailed description which follows when taken in conjunction with the accompanying drawing in which:

Fig. 1 is a top plan view of the condenser and turret assembly but with the condenser lens system and aperture cell removed therefrom, parts of the structure being broken away to more clearly reveal details of construction;

Fig. 2 is an elevational view of the assembly, partly in section taken along lines 2—2 of Fig. 1;

Fig. 3 is a bottom plan view, partly in section, of the condenser and turret assembly; and Figs. 4 and 5 are sectional views of different types of removable aperture cell which may be employed in the condenser and turret assembly.

Referring to the drawing in detail, it will be seen that the numeral 10 indicates a conventional forked substage arm of a microscope which carries near its outer spaced ends a pair of adjustable pins 12 arranged so that they may be moved toward each other and into engagement with a supporting ring 14 for the microscope condenser and turret assembly embodying the present invention. This ring is provided with an outer annular sloping surface 16 for engaging the bight portion of the forked arm 10 and at the upper edge of this surface is provided an annular flange 18 which is arranged to rest upon the upper surface of said arm. Surface 16 and flange 18 locate the ring member 14 in the recess of the forked arm 10 and pins 12 securely but removably retain this ring in place.

Supporting ring member 14 has a downwardly extending enlarged annular flanged portion 20 to which is secured an apertured cover plate 22 which together form an annular recess 24 in which is slidably positioned and confined a diaphragm supporting member 25. Member 25 has an upwardly extending portion 26 provided with an internal annular lip 27. Upon the portion 26 is positioned a lower integral annular portion 28 of a turret housing 29 and a clamping ring 30 is threaded into this lower portion 28 in such a manner that a flanged edge thereof engages the lip 27 and clamps member 25 securely to the housing member 29. A cover 32 is provided for the housing 29 and is bolted or otherwise secured thereto in such a manner that this cover and housing together form an annular recess 34 in which a rotatable turret or carrier 36 is arranged to operate.

The turret housing 29 is provided with an upstanding central lug or boss 38 which provides a bearing surface for the rotatable carrier 36. The turret housing member 29 is made of such thickness or height that the rotatable carrier and parts carried thereby will be accommodated within the recess 34 and may be rotated about boss 38. Formed in the carrier or turret 36 are a plurality of openings 40 equally spaced from each other and equally spaced from the bearing for the boss 38 so that any one of these several openings may be rotated into substantial alignment with a condenser lens system 42 which may be removably screw-threaded into an opening 44 formed in the cover member 32 directly about the annular opening in clamping ring 30.

In the particular carrier 36 shown in the drawing, five openings are shown. Obviously a different number could be employed. In all but one of these openings are positioned centerable supporting rings 46 and each ring 46 is provided with internal threads 48 for removably receiving an aperture cell 49 such as shown in Fig. 2, or as shown somewhat enlarged in Figs. 4 and 5. A plate-like retainer 50 is bolted or otherwise secured to the lower side of the carrier 36 and is apertured in the same manner as the carrier 36 but these apertures or openings are of somewhat smaller size so that this retainer will engage the centerable rings 46 and retain same within their respective openings 40. The thickness of each ring 46 is such as to fit snugly between retainer 50 and an annular flange 52 formed on the carrier 36 at each aperture 40. A star-shaped recess 54 is formed in the carrier 36 about the central bearing opening therein and the radial arms of this recess are arranged to communicate with the apertures 40. Thus a ring-shaped spring member 56 having radial spring arms 57 may be positioned in the recess and arranged to bear against the individual rings 46 for urging each in an outward direction. The aperture 40 which is to be left unoccupied (for reasons to be later described) need not be provided with a ring 46 or a flange 52 and accordingly only a short arm is shown at 58.

In the carrier 36 adjacent each occupied aperture 40 is arranged a pair of centering screws 58 positioned at approximately 120° apart and in opposition to a spring arm 57, as indicated in Fig. 1. These screws have inwardly projecting ends arranged to engage the ring 46 so that adjustment of these centering screws 58 may effect a centering of an aperture cell 49 when positioned in a ring 46. In the turret housing 29 in alignment with these screws 58, when a cell 49 in a ring 46 is in operative position in substantial alignment with the condenser lens assembly 42, are located a pair of hollow guide members 60. The openings in guide members 60 are only of sufficient size to allow a relatively small tool to be inserted therein for engagement with the screws 58 so that by proper rotation of either or both of these screws the ring 46 and, accordingly, the cell 49 carried thereby may be moved laterally as desired relative to the optical axis of the condenser lens assembly. The purpose of such adjustment will be later described. At least one of these screws 58 is arranged to enter a small recess 58' in the ring 46 and thereby prevent rotation of the ring when a cell 49 is being screwed into or removed from the ring.

Indexing means in the form of a spring arm 62 secured to the inner wall of the turret housing 29 and carrying a small roller 64 in the bifurcated outer ends thereof is arranged to engage any one of a plurality of equally spaced peripheral V-shaped notches 66. These notches are so located that when engaged by the roller a corresponding aperture 40 in the turret or carrier will be properly located and retained in substantial alignment with the condenser lens assembly 42. When the carrier is rotated the roller 64 will be forced outwardly by the notch 66 and will roll along the peripheral surface 68 upon the carrier until the next notch is reached. Engagement of the roller 64 with any one of said notches 66 for the occupied aperture 40 will align a corresponding pair of adjustment screws 58 with the pair of hollow guide members 60.

The condenser lens system assembly 42 serves to prevent, during normal use of the assembly, the entrance of dust or the like into the interior of the housing 29 which might interfere with the optical performance of the instrument. To prevent dust entering from the lower side of the assembly, the clamping ring 30 is provided with a transparent window 70 and this window is retained in place in a recess therein by a conventional threaded ring 72. Since the peripheral knurled portion of the carrier 36 must extend outwardly of the housing sufficiently to be engaged and operated by a finger of the operator of the instrument, the portion of the housing 29 opposite the apertured annular portion 28 is foreshortened somewhat so that the carrier may extend outwardly thereof. This foreshortened portion is provided with an inwardly (upwardly) extending annular rib 74 which is closely received in a small annular groove or recess in the carrier 36. The cover member 32 is likewise foreshortened opposite the opening for the condenser lens system and is provided with an inwardly (downwardly) projecting nearly completely annular rib 76 arranged to fit closely into an upper annular groove or recess in carrier 36. These ribs and annular recesses together serve to form a substantially dust-proof sealing means for this part of the assembly.

In Figs. 4 and 5 are shown two examples of aperture cells 49 which may be screw-threaded into any one of the rings 46 in the carrier 36 when the condenser lens system 42 has been temporarily removed from the housing. While a great many different aperture cells may be needed for carrying out the technique of phase microscopy, each such cell will comprise an outer threaded mount 78 in which may be positioned an aperture plate 80. This plate may be retained in place, when space permits, by a threaded ring 82 or when the plate is of appreciable thickness as in Fig. 5 it may be held therein by means of an integral spun flange. These aperture cells, in the preferred construction, are provided with different sizes of circular openings 86 for the passage of light therethrough. A circular opaque coating is carried upon the aperture plate concentric with the opening 86, such as is indicated at 88 in Fig. 4. Thus the opening 86 and coating 68 together determine the inner and outer limits of an annular light opening formed thereby. This light opening must be accurately located laterally with respect to the optical axis of the microscope and into exact predetermined relation with the particular coated phase plate with which it is to be used, such phase plate being generally positioned in or adjacent the microscope objective. Or at times the phase coating is placed directly upon a lens surface of the objective.

With reference to Fig. 5 it will be noted that the aperture 86 is of considerable size and that the opaque coating 88 is also greatly increased. Also instead of being located upon the upper surface of the aperture plate 80, as in Fig. 4, it is located upon the lower surface thereof and at a considerable distance from the plane of aperture 86. The purpose for this is to allow the different aperture plates to be properly arranged with reference to the characteristics of the particular objective and condenser lens combination with which it is to be employed. For example, in the latter case it would be used with an objective of high power and since the curvature of field thereof would be exceedingly steep, the outer limits of the light path would be best defined by an edge relatively near the condenser while the inner limits of the light aperture would be best defined when the outer edge of the coating 88 is upon the lower surface of the aperture plate.

As previously stated the supporting member 25 is retained within a recess 24. This recess is of sufficient size to allow the member 25 and accordingly. the entire turret housing and condenser lens system thereon to be adjusted laterally relative to the optical axis of the microscope objective. This adjustment would be the initial adjustment for the assembly after it had been secured in arm 10. To effect such lateral adjustment of the housing and condenser system spaced hand screws 90 are provided in the flange 20 and engage the outer surface of the supporting member 25. A spring pressed plunger 94 slidably carried in a housing 96 is provided upon the outer surface of the flange 20 and serves to urge the member 25 toward the screws 90 at all times. A conventional iris diaphragm 97 is located in an annular recess in the member 25 and is moved bodily therewith during centering of the turret housing and condenser lens system. A control arm 98 extends outwardly through a substantially 90 degree slot 99 in the member 20 for controlling the intensity of light reaching aperture cells 49. After the initial adjustment by screws 90 has been effected adjustments of the individual cells 49 in their rings 46 may be made to bring the light aperture of the individual cell into exact coincidence with the particular phase plate or coating with which the aperture plate is to be used. The unoccupied opening 40 enables the microscope to be used in a conventional manner without phase diaphragms.

While the invention has been described in detail in relation to a phase microscope, it should be noted that an equivalent construction might be utilized in other optical and ophthalmic instruments, for example ophthalmological instruments and the like.

I claim:

1. A device of the character described comprising a supporting member adapted to be operatively positioned in fixed relation to a part of a phase microscope located beneath the stage thereof, a hollow housing carried by said supporting member and substantially completely enclosed at its upper side except for a light opening therein, a condenser lens system carried by said housing and closing said opening, manually adjustable means carried by said supporting member and engaging said housing for adjusting said housing and condenser lens system laterally in any desired direction relative to said supporting member for aligning said condenser lens system with the optical axis of the objective of said microscope, a rotatable carrier supported by and within said housing and having a plurality of apertures formed therein, means extending outwardly through said housing for manually rotating said carrier to bring any one of said apertures into substantial alignment with said light opening, means engageable with said carrier for centering and releasably retaining each of said apertures respectively in said substantial alignment with said light opening, an optical element having adjacent sharply defined areas of different optical properties carried by said carrier adjacent one of said apertures in a manner so as to intercept light passing therethrough when the aperture is positioned in substantial alignment with said light opening, and manually operable means carried by said carrier for adjusting said optical element laterally in any desired direction relative to the optical axis of said condenser lens system and into an exact predetermined position relative to a sharply defined area positioned in said microscope in operative relation to said objective, last named means being aligned with small holes in said housing so as to be accessible from the exterior of said housing when the aperture is positioned in said substantial alignment with said light opening.

2. A device of the character described comprising a supporting member adapted to be operatively positioned in fixed relation to a part of a phase microscope located beneath the stage thereof, a hollow housing carried by said supporting member and substantially completely enclosed at its upper side except for a light opening therein, a condenser lens system carried by said housing and closing said opening, manually adjustable means carried by said supporting member and engaging said housing for adjusting said housing and condenser lens system laterally in any desired direction relative to said supporting member for aligning said condenser lens system with the optical axis of the objective of said microscope, a rotatable carrier supported by and within said housing and having a plurality of apertures formed therein, means extending outwardly through said housing for manually rotating said carrier to bring any one of said apertures into substantial alignment with said light opening, means engageable with said carrier for centering and releasably retaining each of said apertures respectively in said substantial alignment with said light opening, an optical element having adjacent sharply defined areas of different optical properties carried by said carrier adjacent one of said apertures in a manner so as to intercept light passing therethrough when the aperture is positioned in substantial alignment with said light opening, and manually operable means carried by said carrier for adjusting said optical element laterally in any desired direction relative to the optical axis of said condenser lens system and into an exact predetermined position relative to a sharply defined area positioned in said microscope in operative relation to the objective thereof, said last named means being aligned with small holes in said housing so as to be accessible from the exterior of the housing when the aperture is positioned in said substantial alignment with said light opening, said condenser lens system being readily removable from said housing and said light opening being of sufficient size to allow passage of said optical element therethrough.

3. A device of the character described comprising a supporting member adapted to be operatively positioned in fixed relation to a part of a phase microscope located beneath the stage thereof, a hollow housing carried by said supporting member and substantially completely enclosed at its upper side except for a light opening therein, a condenser lens system carried by said housing and closing said opening, manually adjustable means carried by said supporting member and engaging said housing for adjusting said housing and condenser lens system laterally in any desired direction relative to said supporting member for aligning said condenser lens system with the optical axis of the objective of said microscope, a rotatable carrier supported by and within said housing and having a plurality of apertures formed therein, means extending outwardly through said housing for manually rotating said carrier to bring any one of said apertures into substantial alignment with said light opening, means engageable with said carrier for centering and releasably retaining each of said apertures respectively in said substantial alignment with said light opening, an optical element having adjacent sharply defined areas of different optical properties carried by said carrier adjacent one of said apertures in a manner so as to intercept light passing therethrough when the aperture is positioned in substantial alignment with said light opening, manually operable means carried by said carrier for adjusting said optical element laterally in any desired direction relative to the optical axis of said condenser lens system and into an exact predetermined position relative to a sharply defined area positioned in said microscope in operative relation to said objective, said last named means being aligned with small holes in said housing so as to be accessible from the exterior of said housing when the aperture is positioned in said substantial alignment with said light opening, a second light opening in a lower wall of said housing beneath the first mentioned light opening, and a transparent window arranged to close said second light opening.

4. A device of the character described comprising a supporting member adapted to be operatively positioned in fixed relation to a part of a phase microscope located beneath the stage thereof, a hollow housing carried by said supporting member and substantially completely enclosed at its upper side except for a light opening therein, a condenser lens system carried by said housing and closing said opening, manually adjustable means carried by said supporting member and engaging said housing for adjusting said housing and condenser lens system laterally in any desired direction relative to said supporting member for aligning said condenser lens system with the optical axis of the objective of said microscope, a rotatable carrier supported by and within said housing and having a plurality of apertures formed therein, means extending outwardly through said housing for manually rotating said carrier to bring any one of said apertures into substantial alignment with said light opening, mean engageable with said carrier for centering and releasably retaining each of said apertures respectively in said substantial alignment with said light opening, an optical element having adjacent sharply defined areas of different optical properties carried by said carrier adjacent one of said apertures in a manner so as to intercept light passing therethrough when the aperture is positioned in substantial alignment with said light opening, manually operable means carried by said carrier for adjusting said optical element laterally in any desired direction relative to the optical axis of said condenser lens system and into an exact predetermined position relative to a sharply defined area positioned in said microscope in operative relation to the objective thereof, said last named means being aligned with small holes in said housing so as to be accessible from the exterior of the housing when the aperture is positioned in said substantial alignment with said light opening, said condenser lens system being readily removable from said housing and said light opening being of sufficient size to allow passage of said optical element therethrough, a second light opening in a lower wall of said housing beneath the first mentioned light opening, and a transparent window arranged to close said second light opening.

5. A device of the character described comprising a supporting member adapted to be operatively positioned beneath the stage of a microscope and in fixed relation to a part of said microscope, a hollow housing supported by said member, a condenser lens system carried by an upper wall of said housing and closing a light opening therein, means for adjusting said housing and condenser lens system laterally in any desired direction relative to said supporting member for aligning said condenser lens system with the optical axis of the objective of said microscope, a rotatable carrier supported by and entirely within said housing except for a manually engageable peripheral portion extending outwardly through a slot in said housing, a plurality of apertures formed in said carrier, means engageable with said carrier for releasably retaining any one of said apertures in a predetermined position in substantial alignment with said condenser lens system, an optical element carried by said carrier adjacent one of said apertures, means for adjusting said optical element, when in said predetermined position adjacent said light opening, laterally in any desired direction relative to the optical axis of said objective and into an exact predetermined position relative to a predefined area positioned in said microscope in operative relation to said objective, and closely fitting flanged and grooved means on said housing and carrier adjacent said slot for preventing dust from entering said housing through said slot.

6. A device of the character described comprising a supporting member adapted to be operaatively positioned beneath the stage of a microscope and in fixed relation to a part of said microscope, a hollow housing supported by said member, a condenser lens system carried by an upper wall of said housing and closing a light opening therein, means for adjusting said housing and condenser lens system laterally in any desired direction relative to said supporting member for aligning said condenser lens system with the optical axis of the objective of said microscope, a rotatable carrier supported by and entirely within said housing except for a manually engageable peripheral portion extending outwardly through a slot in said housing, a plurality of apertures formed in said carrier, means engageable with said carrier for releasably retaining any one of said apertures in a predetermined position in substantial alignment with said condenser lens system, an optical element carried by said carrier adjacent one of said apertures, means for adjusting said optical element, when in said predetermined position adjacent said light opening, laterally in any desired direction relative to the optical axis of said objective and into an exact predetermined position relative to a predefined area positioned in said microscope in operative relation to said objective, closely fitting flanged and grooved means on said housing and carrier adjacent said slot for preventing dust from entering said housing through said slot, a second opening in the lower wall of said housing beneath said light opening, and a transparent window arranged to close said second opening.

7. A device of the character described comprising a supporting member adapted to be operatively positioned beneath the stage of a microscope and in fixed relation to a part of said microscope, a hollow housing supported by said member, a condenser lens system carried by an upper wall of said housing and closing a light opening therein, means for adjusting said housing and condenser lens system laterally in any desired direction relative to said supporting member for aligning said condenser lens system with the optical axis of the objective of said microscope, a rotatable carrier supported by and entirely within said housing except for a manually engageable peripheral portion extending outwardly through a slot in said housing, a plurality of apertures formed in said carrier, means engageable with said carrier for releasably retaining any one of said apertures in a predetermined position in substantial alignment with said condenser lens system, an optical element carried by said carrier adjacent one of said apertures, means for adjusting said optical element, when in said predetermined position adjacent said light opening, laterally in any desired direction relative to the optical axis of said objective and into an exact predetermined position relative to a predefined area positioned in said microscope in operative relation to said objective, closely fitting flanged and grooved means on said housing and carrier adjacent said slot for preventing dust from entering said housing through said slot, a second opening in the lower wall of said housing beneath said light opening, and a transparent window arranged to close said last mentioned opening, said condenser lens system being readily removable from said housing and said light opening being of sufficient size to allow said optical element to be moved therethrough.

THOMAS G. AITCHESON.

REFERENCES CITED

The following references are of record in the file of this patent:

UNITED STATES PATENTS

| Number | Name | Date |
|---|---|---|
| 328,277 | Bausch | Oct. 13, 1885 |
| 1,234,795 | Ott | July 31, 1917 |
| 1,505,418 | Ott | Aug. 19, 1924 |
| 2,404,888 | Richards | July 30, 1946 |
| 2,427,689 | Osterberg et al. | Sept. 23, 1947 |